(12) United States Patent
Byrne

(10) Patent No.: US 6,715,371 B1
(45) Date of Patent: Apr. 6, 2004

(54) METHOD OF TESTING AN AIRBAG MODULE

(75) Inventor: Peter Byrne, Lakewood, NY (US)

(73) Assignee: Airbag Testing Technology, Inc., Falconer, NY (US)

(*) Notice: Subject to any disclaimer, the term of this patent is extended or adjusted under 35 U.S.C. 154(b) by 0 days.

(21) Appl. No.: 10/148,263
(22) PCT Filed: May 11, 2000
(86) PCT No.: PCT/IB00/00808
§ 371 (c)(1),
(2), (4) Date: Oct. 18, 2002
(87) PCT Pub. No.: WO01/42059
PCT Pub. Date: Jun. 14, 2001

(30) Foreign Application Priority Data

Dec. 7, 1999 (GB) .............................................. 9928934

(51) Int. Cl.⁷ .............................................. G01N 19/00
(52) U.S. Cl. ...................................... 73/865.9; 356/312
(58) Field of Search ............... 73/865.9, 40; 280/728.1; 356/312

(56) References Cited

U.S. PATENT DOCUMENTS

| 5,428,988 A | * | 7/1995 | Starkovich ..................... 73/40 |
| 5,460,058 A | | 10/1995 | Shadoian |
| 5,608,158 A | | 3/1997 | Niederberger et al. |
| 5,621,326 A | | 4/1997 | Watanabe et al. |
| 5,656,991 A | | 8/1997 | Hargenrader et al. |
| 5,740,221 A | | 4/1998 | Norman et al. |
| 5,884,938 A | * | 3/1999 | Rink et al. ................... 280/741 |
| 6,051,158 A | * | 4/2000 | Taylor et al. ............. 280/728.1 |
| 6,175,794 B1 | * | 1/2001 | Muraoka ....................... 701/45 |
| 6,377,169 B1 | * | 4/2002 | Yanagisawa ................ 340/504 |

FOREIGN PATENT DOCUMENTS

| DE | 19650796 | 6/1997 |
| DE | 19617250 | 9/1997 |
| EP | 0747270 | 12/1996 |
| EP | 0752592 | 1/1997 |
| JP | 02187594 A | * 7/1990 ........... F28D/15/02 |

OTHER PUBLICATIONS

Patent Abstracts of Japan, vol. 1995, No. 8, Sep. 29, 1995 of JP 07 117604 A, May 9, 1995 entitled "Inspection Device and Method for Bulk Loading Type Air Bag Module".

* cited by examiner

Primary Examiner—Hezron Williams
Assistant Examiner—Nashmiya Fayyaz
(74) Attorney, Agent, or Firm—Dykema Gossett PLLC

(57) ABSTRACT

The present invention relates to a method of testing an airbag module for a vehicle and, particularly, but not exclusively, to a method of testing an airbag module for a motor vehicle such as a car. A method of testing an airbag module is provided in which said module is tested for exposure to a given fluid, for example, water. The fluid exposure test ideally comprises the step of inspecting said airbag module or a swab taken therefrom by means of Atomic Absorption Spectroscopy techniques. The present invention thereby provides a testing method sufficiently rigorous to identify fluid damage potentially suffered by a previously installed airbag module during its service life.

14 Claims, 4 Drawing Sheets

METHOD OF TESTING AN AIRBAG MODULE

The present invention relates to a method of testing an airbag module for a vehicle and, particularly, but not exclusively, to a method of testing an airbag module for a motor vehicle such as a car.

Airbag passive restraint systems incorporating one or more airbag modules are widely used in motor vehicles to improve passenger safety and their design and manufacture is well understood by those skilled in the art. Typically, an airbag module comprises three principal components: a reaction can or reaction plate; an inflator or gas generator; and a folded airbag. These components are generally arranged with the gas generator located in an opening of the reaction can and secured together with appropriate fasteners (e.g. bolts). The mouth of the airbag is reinforced with a metal retainer ring and located over the gas generator. The gas generator is thereby encapsulated by the reaction can and the airbag. The fasteners used to secure the gas generator to the reaction can generally also secure the airbag mouth.

The reaction can is the platform upon which the gas generator is traditionally mounted and is usually manufactured as a stamped steel component capable of resisting the significant forces generated during activation of the restraint system. Reaction cans are however being increasingly manufactured from molded plastics materials such as glass filled nylon. The gas generator is typically provided as a metal body which houses a suitable igniter, a gas generant and, depending on the gas generant used, appropriate filters. The person skilled in the art will be familiar with various different types of gas generator presently used in airbag modules. The body of the gas generator is generally provided with a plurality of exit ports for permitting the release of inflation gas to the airbag. The airbag itself is folded adjacent the gas generator so as to be readily inflatable upon system activation.

In addition to the aforementioned principal components, an airbag module also incorporates an electric circuit for enabling electrical connection of the module to control circuitry of the associated restraint system. The circuit typically includes an electric igniter with an integral connector or set of lead wires for connection to the vehicle wiring harness. An airbag module also traditionally incorporates an airbag cover or door which encloses, retains and protects the airbag in its folded position until activation of the restraint system. The cover or door is configured to split along a tear seam when the airbag is inflated.

An airbag module provided in a motor vehicle such as a car is commonly mounted in a hidden compartment within, for example, the vehicle dashboard or steering wheel. In the event of the motor vehicle undergoing a predetermined deceleration (of a magnitude usually only generated during a vehicle collision), the control circuitry associated with the airbag module applies an activation signal to the electric igniter circuit so as to activate the module's gas generator. In response to the activation signal, the igniter fires, which, in turn, ignites the gas generant. The gas generant then rapidly produces high pressure inflation gas.

The inflation gas produced by the gas generant rapidly progresses from the body of the gas generator via the exit ports and flows into the open mouth of the folded airbag. This causes the airbag to expand and displace any associated airbag cover and vehicle fascia. Where the gas generator uses a solid gas generant, the inflation gas is first directed through filters. This cools the gas and removes any burning particles therefrom which may damage the airbag or cause injury to a passenger. Once deployed, the inflated airbag provides a cushion for restraining and absorbing the kinetic energy of a passenger. An airbag passive restraint system is thereby capable of increasing the safety of vehicle passengers.

For many years it has been common practice to recycle certain components of end-of-life motor vehicles. A wide range of components such as engine blocks, exhaust pipes and brake discs have been made available by breakers as relatively inexpensive and generally reliable spare parts. This provision of spare parts not only provides consumers with an attractive alternative to purchasing new components (particularly in circumstances where the vehicle under repair is relatively old), but also has a beneficial effect on the environment through reducing waste. Indeed, in this latter regard, legislation worldwide is tending to increasingly require vehicle manufacturers to increase the proportion of vehicle components which may be recycled. Although it is presently possible to recycle the vast majority of vehicle components, constraints imposed by the technology used in airbag passive restraint systems have, in the past, prevented the recycling of airbag modules. If an airbag module needs to be replaced, the only option hithertofore has been to fit a newly manufactured module.

Unlike many components found in a motor vehicle, a visual inspection of a previously installed airbag module is not sufficient to determine suitability for future use. The current design of a module, as discussed above, is such that the airbag itself may be deployed on only one occasion. Although application of a suitable activation signal will allow determination of whether or not a previously installed airbag module is in good order, subsequent use of the module would not be possible either because the module has failed to activate (indicating its unsuitability for use) or because the module has been properly activated (rendering it unsuitable for use due to, inter alia, gas generant exhaustion). Accordingly, there has been no option in the past but to provide an airbag module as an entirely new piece of equipment. Only in this way has it been possible to effectively guarantee the safe and reliable operation of an airbag passive restraint system.

It is an object of the present invention to provide a method of testing an airbag module.

It is a further object of the present invention to provide a method of testing the suitability of a previously installed airbag module for reuse.

A first aspect of the present invention provides a method of testing an airbag module comprising the step of testing said module for exposure to a given fluid. The given fluid may be water. A number of tests are conducted on certain components of an airbag module at certain specific stages during module manufacture, however these tests alone are not sufficiently rigorous to identify the damage potentially suffered by a previously installed module during its service life. The present invention provides for the testing of module exposure to a fluid such as water. Any damage arising from exposure to water may not be apparent from a mere visual inspection or the presently used testing techniques, but may nevertheless render an airbag module inoperative or seriously degrade its performance capability.

The fluid exposure test may comprise the step of inspecting said airbag module or a swab taken therefrom by means of Atomic Absorption Spectroscopy techniques. Also, the fluid exposure test may comprise the step of inspecting said airbag module or a swab taken therefrom for deposits of a metal. Preferably, the step of inspecting for deposits of a metal comprises the step of inspecting for cations. It is desirable for the step of inspecting for deposits of a metal to quantify the amount of metal deposited. Preferably, the amount of metal deposited is quantified for a given surface area of airbag module.

It is particularly preferable for the step of inspecting for deposits of a metal to comprise the step of taking a swab from a surface of said airbag module by applying a solvent to said surface. The solvent may be 5% hydrochloric acid. Desirably, the step of inspecting for deposits of a metal further comprises the step of agitating said swab with 1% lanthanum chloride solution. In addition, the step of inspecting for deposits of a metal ideally further comprises the step of inspecting the mixture of 1% lanthanum chloride solution and swab by means of Atomic Absorption Spectroscopy so as to determine the quantity of a metal present in said mixture.

The swab may be taken from a surface of said airbag module which cannot be conveniently wiped clean. Said surface is ideally a surface of the gas generator or a surface adjacent to the gas generator. However, said surface may be a surface of the reaction can.

It is also desirable for the fluid exposure test to comprise the further step of determining a threshold quantity of a deposited metal which, if found on said airbag module, indicates an unacceptable risk of said module having been damaged through fluid exposure.

The deposited metal may be calcium or sodium.

Thus, where a motor vehicle has been immersed in water (e.g. due to flooding), a potential degradation of the vehicle's airbag module as a result of water exposure may be detected by the present invention. If, during the testing of the airbag module in accordance with the present invention, it is determined that the airbag module has been exposed to water (or that there is an unacceptably high risk that the module has been damaged due to water exposure), then the module will not be regarded as acceptable for future use. The testing method of the present invention therefore represents a significant advancement in the art.

A second aspect of the present invention provides a method of testing an airbag module comprising the steps of: (i) locating an airbag module which has been previously installed; (ii) establishing a set of criteria to be satisfied before said airbag module is deemed acceptable for future use; and (iii) investigating against said set of criteria so as to determine the acceptability of said airbag module for future use. These steps may comprise the method of testing an airbag module for exposure to a given fluid as disclosed above.

Thus, the present invention provides means for permitting the re-use of an airbag module which has been previously installed in a motor vehicle. Where a motor vehicle has reached the end of its operational life, the present invention provides for the investigation of an airbag module installed in said vehicle against a set of criteria. If these criteria are satisfied, then the airbag module may be regarded as acceptable for future use, even though it may not be a new piece of equipment. The criteria to be satisfied may vary depending on the type of airbag module in question. Also, the criteria to be satisfied may be more stringent for old modules than for recently installed modules.

A method of testing an airbag module for a vehicle according to the present invention will now be described with reference to the accompanying drawings, in which.

Figure 1:
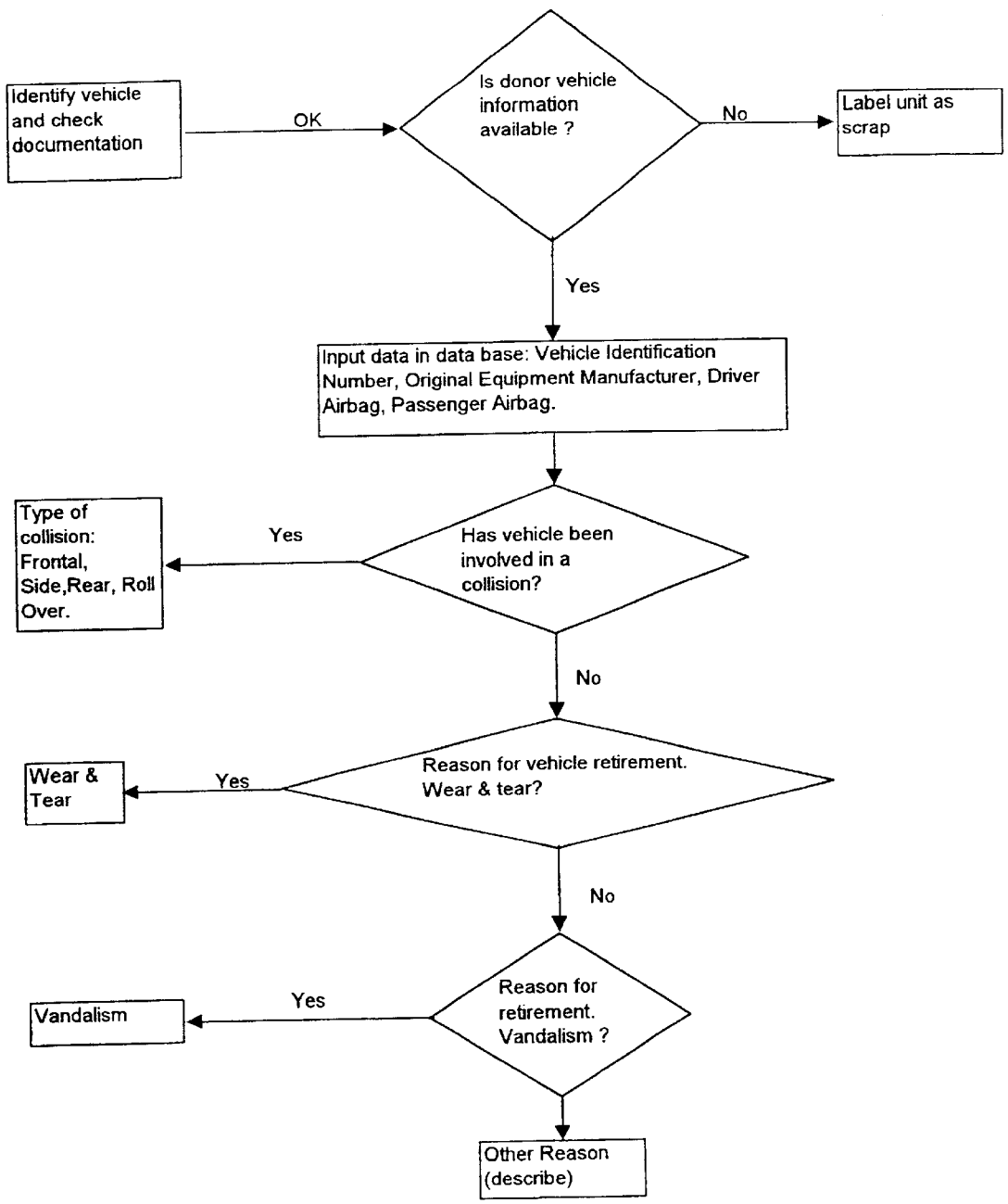
FIG. 1 is a flow chart showing a procedure for obtaining vehicle data.
Figure 2:
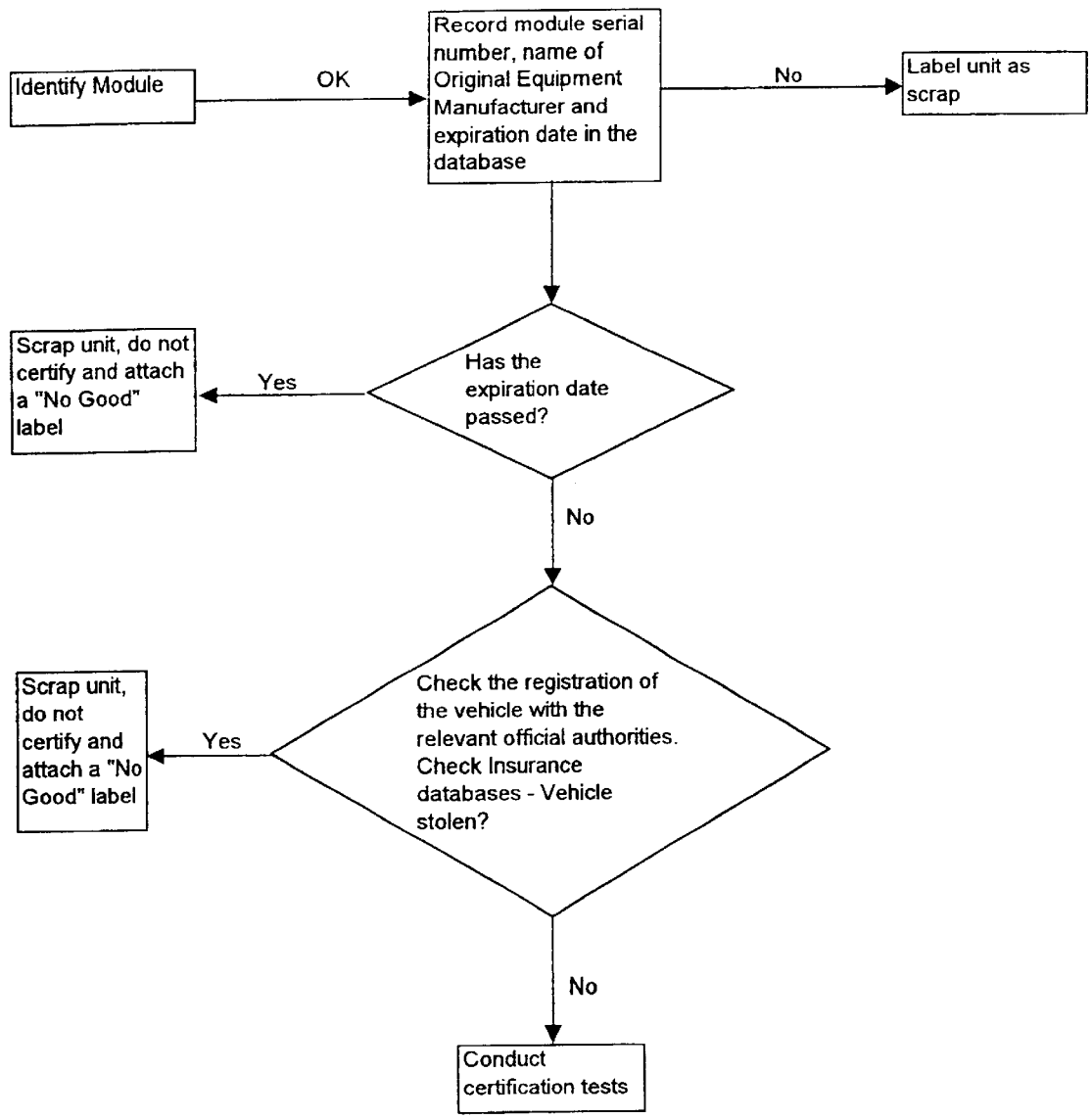
FIG. 2 is a flow chart showing a procedure for obtaining airbag module data.
Figure 3:
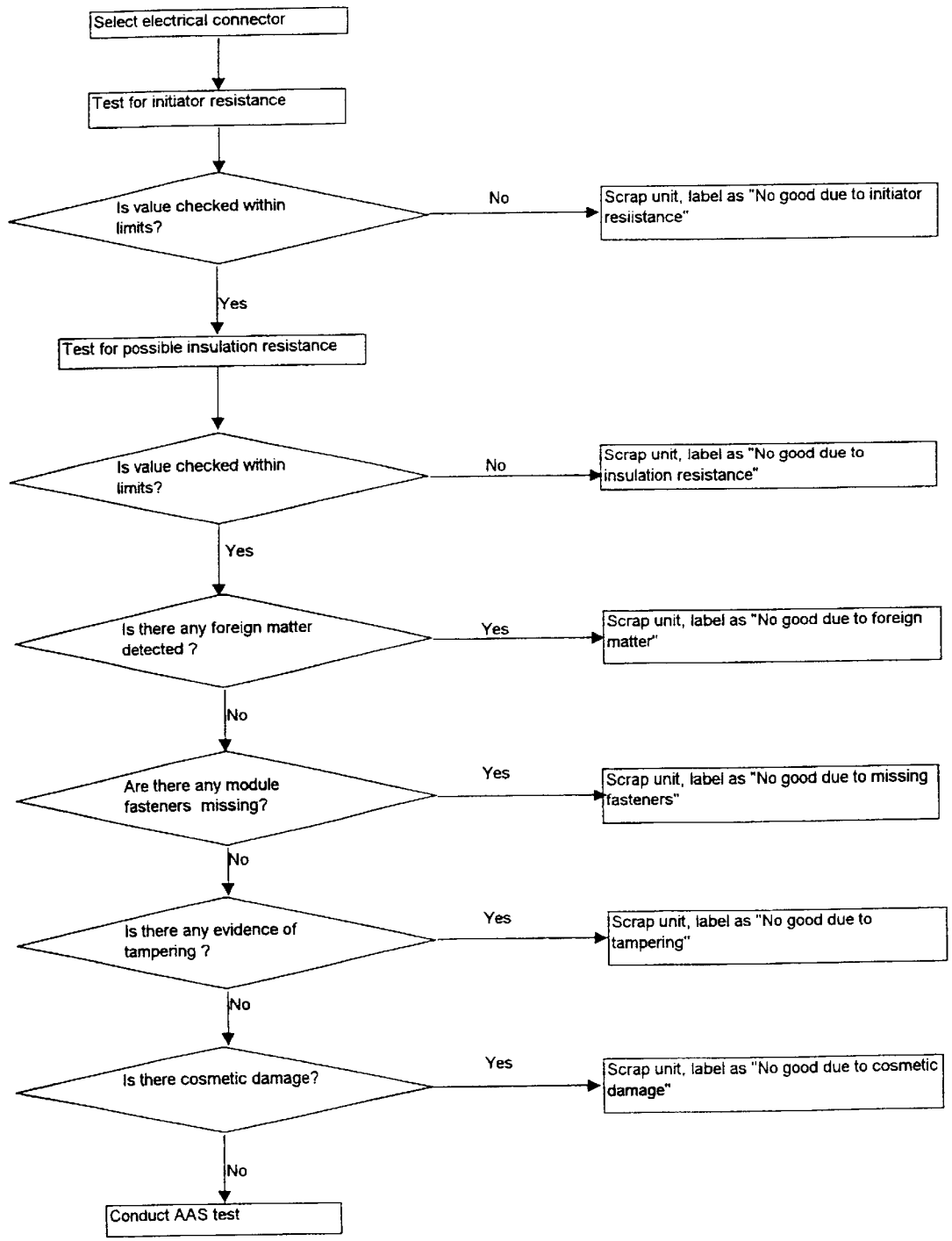
FIG. 3 is a flow chart showing a procedure for testing an airbag module.
Figure 4:
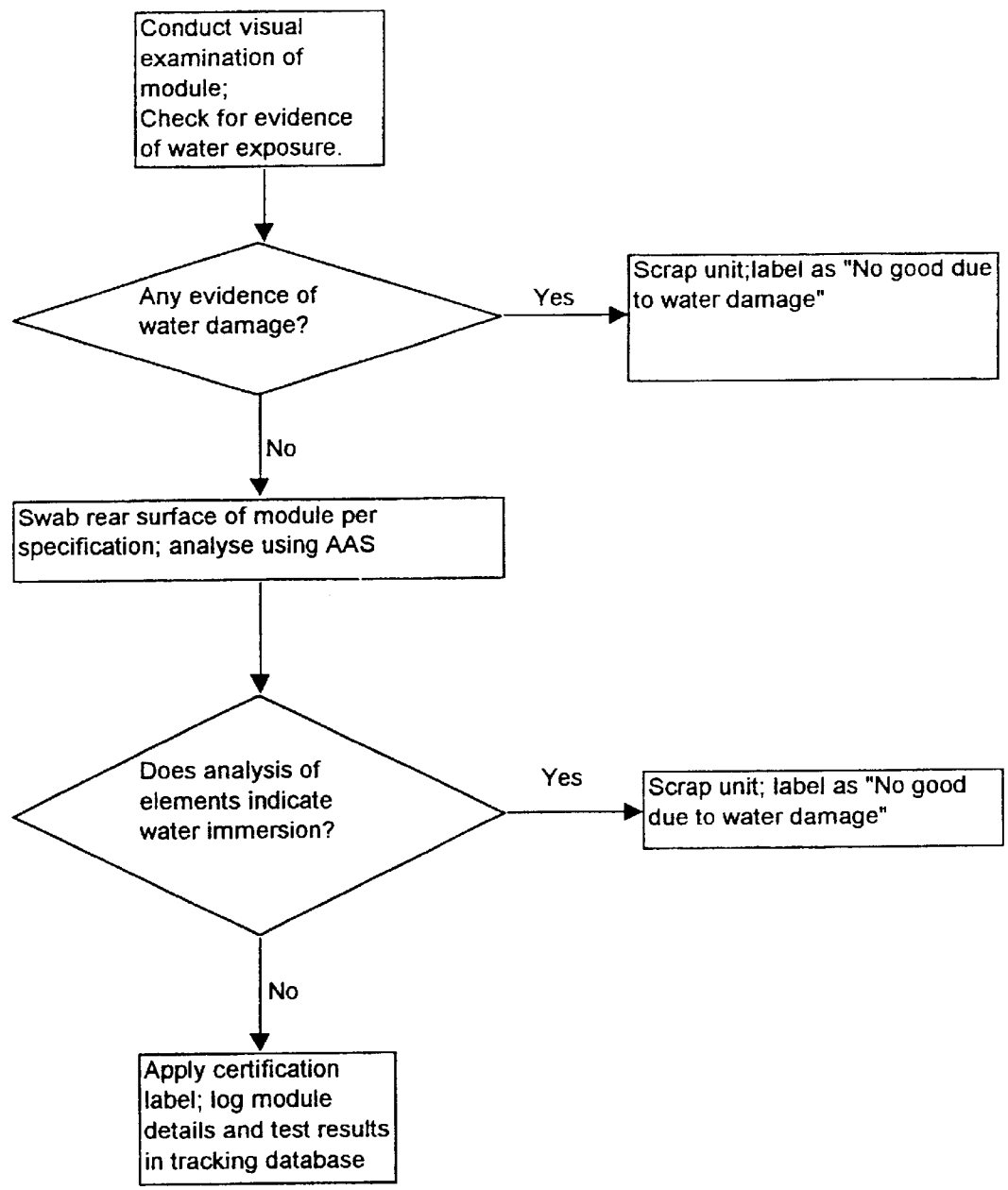
FIG. 4 is a flow chart showing a procedure for testing an airbag module for fluid exposure.

A recycled airbag module may be certified as suitable for future installation and use in a vehicle provided certain criteria are satisfied. The following procedural steps determine this suitability. The general aim of the various steps is to identify undesirable degradation of a subject airbag module, without disassembly thereof, through technical inspection/testing, and, to identify, through an investigation of appropriate records, any event in the history of the module which may indicate a likelihood of undesirable degradation.

Procedural Step 1—Vehicle and Airbag Module Details

In circumstances where the airbag module under investigation has been previously installed in a motor vehicle (e.g. in a vehicle which is no longer operational, i.e. an End of Life Vehicle (ELV)), a first procedural step seeks to uniquely identify said vehicle and identify events in the history of said vehicle which may have degraded the subject module. This is achieved through a visual inspection of official documents relating to said vehicle. The following vehicle details are recorded a) Vehicle original equipment manufacturer (OEM)
b) Vehicle model
c) Vehicle body style
d) Vehicle Identification Number (VIN)
e) Vehicle model year
f) Vehicle log available?—Yes/No
g) Vehicle involved in collision prior to current retirement event?—Yes/No
   If "Yes", then collision type?—● Front● Side● Rear■ Roll Over
h) Vehicle retirement due to wear and tear?—Yes/No
   If "No", then vehicle retirement due to collision?—Yes/No
   If "Yes", then collision type?—Front● Side● Rear● Roll Over
   If "No", then vehicle retirement due to vandalism?—Yes/No
   If "No", then reason for vehicle retirement?
i) Vehicle ever immersed in water?—Yes/No Having recorded the details of any vehicle (or vehicles) in which a subject airbag module has been previously installed, the following details of the airbag module itself are investigated and recorded— j) Airbag Module manufacturer
k) Airbag Module serial number
l) Airbag Module gas generator type
m) Airbag Module date of manufacture The date of manufacture of the airbag module is particularly relevant where the propellant has a limited useful life. In such cases, the date of manufacture is used to calculate the remaining life of the propellant. An expiry date for the propellant is then indicated on a final certification label attached to the airbag module on completion of the investigation procedure.

The above details are conveniently provided in response to the prompts of either dedicated electronic hardware or a personal computer executing appropriate software. Indeed, all procedural steps are directed by the prompting of an operator in this way. The response to all prompts is electronically stored under a unique identification number ascribed to the subject airbag module at the beginning of the investigation procedure. A label marked with this identification number is then attached to the module so as to provide traceability. The identification label also allows ready access to the determination of the investigation procedure as a whole or of a particular procedural step. For additional convenience, the identification number is marked on the identification label as a bar code. The identification number of a particular airbag module may be then quickly accessed by means of a bar code reader. The identification label is preferably printed and securely attached to the subject module at the end of the first procedural step.

Procedural Step 2—Electrical Test:

A second procedural step seeks to determine the electrical integrity of the lead wire (if present), the electrical connector and the igniter circuit. The procedure is conducted with suitable equipment (e.g. a Squib Circuit Tester) for measuring the resistance of a circuit in response to the accurate application of an appropriate current for a specific duration. This electrical testing equipment is connected to the subject module by means of the module's electrical connector. The electronic hardware directing the investigation procedure is adapted to indicate to the operator the adapter required for connection to the module's electrical connector. This is achieved on the basis of information supplied during the first procedural step. Thus, once the vehicle and airbag module details required by the first procedural step have been stored under a module's identification number, the scanning of that module's identification label will allow convenient identification of the required adapter. A suitable adapter is then selected from an appropriate store. The controlling electronic hardware is also configured to request confirmation from the operator that the correct adapter has been fitted. If the correct adapter is not available, then further prompts directing completion of the electrical test are withheld.

Once the correct adapter has been fitted so as to connect the subject airbag module to the electrical testing equipment, the operator is directed to place the module in a shielded test station. This ensures safety in the event of the airbag module being activated. The controlling electronic hardware is connected to the electrical testing equipment so as to automatically set the test parameters (on the basis of information supplied during the first procedural step), conduct the electrical test and record the results. The test undertaken depends upon whether or not the OEM specification for the subject module is available. If the OEM specification is known, then the airbag module is tested to the electrical criteria defined therein. Otherwise, the airbag module is tested to a default set of electrical criteria which may or may not be specifically tailored to the particular type of module under investigation.

Airbag Module OEM Specification Available

A first test current is applied to the igniter circuit at the level defined in the OEM specification and the current resistance is measured.

The measured resistance is recorded and compared with the requirements of the OEM specification.

If the measured resistance does not satisfy the requirements of the OEM specification, then the airbag module is rejected and not subjected to further investigation.

A "no fire" test current is applied to the igniter circuit at the level and for the duration defined in the OEM specification and the response of the airbag module is monitored.

If the airbag does not deploy, then the airbag module is considered to satisfy the "no fire" electrical requirements of the OEM specification.

If the airbag does deploy, then the airbag module is rejected and not subjected to further investigation.

Airbag Module OEM Specification Unavailable

A test current of generally 100 mA and 200 mA is applied to the igniter circuit. The igniter bridgewire resistance, the resistance to ground and the shunt resistance is measured.

The measured resistances are recorded and compared with predetermined baseline requirements. If the measured resistances do not satisfy the predetermined baseline requirements, then the airbag module is rejected and not subjected to further investigation.

The results of the electrical test are recorded under the identification number of the subject module.

Procedural Step 3—Foreign Matter Test:

A third procedural step seeks to identify the presence of foreign matter (e.g. grit/dirt) within the airbag module under investigation. This is achieved by means of a shake test and an X-ray test. The shake test simply involves shaking or vibrating the subject module so that any loose foreign matter within the module rattles in an audible manner. The X-ray test requires the use of X-ray equipment which preferably incorporates a conveyor belt for moving the subject module when exposed to X-rays and an appropriate shield for protecting the operator. The electronic hardware controlling the investigation is adapted to ask the operator for the module's identification number and to provide the operator with appropriate instructions for using the X-ray equipment. The identification number is typically supplied by scanning the bar code of the module's identification label. On completion of the foreign matter test, the controlling electronic hardware prompts the operator as follows Was any foreign matter detected?—Yes/No If "No", then completion of the foreign matter test is confirmed.

If "Yes", then can the foreign matter be removed without damage to the airbag module?—Yes/No If "Yes", then completion of the foreign matter test is confirmed subject to removal of the identified foreign matter from the airbag module.

If "No", then the airbag module is rejected and not subjected to further investigation.

The results of the foreign matter test are recorded under the identification number of the subject module.

Procedural Step 4—Fastener Integrity Test:

A fourth procedural step seeks to confirm that all fasteners (e.g. screws, rivets and bolts) of the airbag module are in place and secure. This is achieved through visual inspection. The electronic hardware controlling the investigation is adapted to ask the operator for the module's identification number and to provide the operator with appropriate instructions for completing the fastener integrity test. The identification number is typically supplied by scanning the bar code of the module's identification label. On completion of the test, the controlling electronic hardware prompts the operator as follows Were all fasteners in place and secure?—Yes/No If "Yes", then completion of the fastener integrity test is confirmed.

If "No", then the airbag module is rejected and not subjected to further investigation.

The results of the fastener test are recorded under the identification number of the subject module. Optionally, photographs of the fasteners may be taken and digitally stored under the module's identification number. The direction of the controlling electronic hardware is such that the subject module is rejected if merely one of its fasteners is loose or missing.

Procedural Step 5—Fluid Exposure Test:

A fifth procedural step seeks to determine whether or not the airbag module under investigation has been exposed to fluid (e.g. water) which may cause an undesirable degradation in module performance. This is achieved by visual inspection of the airbag module and through use of Atomic Absorption Spectroscopy (AAS) techniques.

A motor vehicle may well become exposed to water during its operational life. Where a vehicle is partially or completely immersed in water (for example, river, lake or sea water), perhaps as a result of a flood or a road traffic accident, it is possible for an installed airbag module to suffer water induced damage to the gas generator or the airbag itself. However, such damage may not be readily detected through a simple visual inspection.

The water most likely to be exposed to an airbag module (i.e. river, lake and sea water) characteristically contains detectable levels of deposited metals such as calcium and sodium. Although an airbag module may be handled (and thereby inadvertently cleaned) following exposure to water, a detectable level of calcium and/or sodium deposited on the module will tend to remain. The surface of the reaction can adjacent the gas generator is particularly likely to retain detectable calcium/sodium deposits since this surface is covered by the airbag and is not therefore readily accessible either for unintentional or intentional cleaning. Through use of Atomic Absorption Spectroscopy techniques, a subject airbag module may be investigated for the presence of positively charged cations associated with calcium/sodium. If the calcium/sodium levels detected are greater than a predetermined acceptable level, then it may be concluded that there is an unacceptably high risk that the subject airbag module has suffered damage due to exposure to water.

Although any surface of an airbag module may be subjected to the fluid exposure test, it is highly preferable for the tested surface to be one which not only readily receives and retains a fluid in which the module is immersed, but a surface which is also unlikely to be wiped clean. Since the outer surfaces of a module may be cleaned quite readily, it is preferable for the inner surface of reaction can adjacent the gas generator to be investigated. Testing of this surface is also desirable since it is the gas generator which is most likely to suffer damage from fluid exposure. Access to this surface may be gained through apertures in the module. Disassembly of the module is not therefore necessary.

Once a suitable surface for testing has been selected, a swab is taken from said surface using a wetting agent or more particularly a solvent such as 5% hydrochloric acid. The swab is taken from a predetermined magnitude of surface area. The swab is then reacted with a 1% lanthanum chloride solution and the resulting solution analysed for levels of calcium/sodium using Atomic Absorption Spectroscopy. A measure of calcium/sodium may be thereby derived in terms of milligrams per liter (for a given magnitude of surface area). If considered necessary, the quantity of calcium/sodium detected on the tested surface (and the predetermined level considered acceptable) may be expressed through reference to a datum level. This may be achieved by analysing swab blanks (i.e. a solution of solvent (5% hydrochloric acid), which has not been applied to the test surface, and 1% lanthanum chloride solution) and subtracting the calcium/sodium levels thereof from those of a test surface. Having determined the levels of calcium and sodium present on the test surface, appropriate comparison of said levels with the predetermined levels considered acceptable may then be made.

A number of factors should be considered when determining the calcium/sodium levels above which there is an unacceptably high risk of a subject airbag module having been exposed to water. Firstly, calcium deposits will arise from fresh water sources such as rivers, ponds and lakes. Sodium deposits will arise from salt water sources. Atmospheric conditions (such as humidity) may also vary the calcium/sodium traces found on an airbag module. Thus, the place of manufacture and subsequent use of an airbag module may give rise to heightened levels of calcium/sodium even though there has been no direct contact with water which would be regarded as potentially damaging. Thus, the history of a subject airbag module (and that of the vehicle from which it has been extracted) may well be relevant when undertaking the fluid exposure test.

In addition to the visual and Atomic Absorption Spectroscopy inspection, the question of whether or not the airbag module has been exposed to water is addressed by reference to the vehicle log (see Procedural Step 1).

The electronic hardware controlling the investigation is adapted to ask the operator for the module's identification number and to provide the operator with appropriate instructions for conducting the Atomic Absorption Spectroscopy test. The identification number is typically supplied by scanning the bar code of the module's identification label. The electronic hardware also directs the operator to undertake both a visual inspection of the subject module and a review of the associated vehicle log. On completion of the fluid exposure test, the controlling electronic hardware prompts the operator as follows Was evidence of fluid exposure detected?—Yes/No
If "No", then completion of the fluid exposure test is confirmed.
If "Yes", then the airbag module is rejected and not subjected to further investigation.

The results of the fluid exposure test are recorded under the identification number of the subject module.

Procedural Step 6—Cosmetic Test:

A sixth procedural step seeks to determine whether an airbag module has been visually damaged to an extent which may potentially degrade module performance. This is achieved by visual inspection of the airbag module, with particular regard being had to the airbag cover and the reaction can. The condition of any original paint or warning/identification stickers on the subject module is also considered. If paint has been applied to the module since manufacture, then the module is rejected as unsuitable for future use. The electronic hardware controlling the investigation is adapted to ask the operator for the module's identification number and to provide the operator with appropriate instructions for undertaking the cosmetic test. The identification number is typically supplied by scanning the bar code of the module's identification label. On completion of the cosmetic test, the controlling electronic hardware prompts the operator as follows- Was any evidence of damage detected?—Yes/No
If "No", then completion of the cosmetic test is confirmed.
If "Yes", then the airbag module is rejected and not subjected to further investigation.

The results of the cosmetic test are recorded under the identification number of the subject module.

If the airbag module under investigation is deemed to satisfy the criteria set by the aforementioned procedural steps, then a certification label is prepared and attached to the reaction can (or other suitable component) of the module. The certification label states that the subject module is suitable for reinstallation by a qualified technician in a specified vehicle. Depending upon the type of gas generant used in the module, the certification will also indicate the expiry date of the gas generator. Once the certification label has been securely attached, the airbag module is sealed within a tamper evident container. The airbag module is then suitable for re-sale and subsequent re-use.

The present invention is not limited to the specific method described above. Alternatives will be apparent to a reader skilled in the art. For example, the procedural steps may be completed in an order different to that indicated hereinabove. It is, however, desirable for the vehicle and airbag module details to be recorded before undertaking any tests. Further alternatives include the use of ICP (i.e. Inductively Coupled Plasma), polarography or colourimetric techniques for the fluid exposure test rather than the Atomic Absorption Spectroscopy (AAS) technique discussed. When using these alternative techniques, a swab may be taken from a subject airbag module in the manner described with regard to the Atomic Absorption Spectroscopy procedure.

What is claimed is:

1. A method of testing an airbag module, for past exposure to water, said testing comprising the steps of inspecting, by means of Atomic Absorption Spectroscopy techniques, a swab taken from said airbag module and determining from said inspecting step whether the airbag module has been exposed to water in the past.

2. A method as claimed in claim 1, comprising inspecting for deposits of a metal.

3. A method as claimed in claim 2, wherein the step of inspecting for deposits of a metal comprises the step of inspecting for cations.

4. A method as claimed in claim 2, wherein the step of inspecting for deposits of a metal quantifies the amount of metal deposited.

5. A method as claimed in claim 4, wherein the step of inspecting for deposits of a metal quantifies the amount of metal deposited for a given surface area of airbag module.

6. A method as claimed in claim 2, wherein the step of inspecting for deposits of a metal comprises the step of taking the swab from a surface of said airbag module by applying a solvent to said surface.

7. A method as claimed in claim 6, wherein the solvent is 5% hydrochloric acid.

8. A method as claimed in claim 6, wherein the step of inspecting for deposits of a metal further comprises the step of agitating said swab with 1% lanthanum chloride solution.

9. A method as claimed in claim 8, wherein the step of inspecting for deposits of a metal further comprises the step of inspecting the mixture of 1% lanthanum chloride solution and swab by means of said Atomic Absorption Spectroscopy so as to determine the quantity of a deposited metal present in said mixture.

10. A method as claimed in claim 6, wherein said swab is taken from the surface of said airbag module which cannot be conveniently wiped clean.

11. A method as claimed in claim 10, wherein said surfaceis a surface of or adjacent a gas generator of said airbag module.

12. A method as claimed in claim 10, wherein said surface is a surface of a reaction can of said airbag module.

13. A method as claimed in claim 2, wherein the water exposure test comprises the further step of determining a threshold quantity of a deposited metal which, if found on said airbag module, indicates an unacceptable risk of said module having been damaged through fluid exposure.

14. A method as claimed in claim 2, wherein said deposited metal is calcium or sodium.

* * * * *